United States Patent [19]

Hiraguri et al.

[11] 4,246,616
[45] Jan. 20, 1981

[54] SYSTEM FOR REPRODUCING A VIDEO SIGNAL IN A SLOW MOTION OR STILL PICTURE REPRODUCTION

[75] Inventors: Seisuke Hiraguri, Yokohama; Akira Hirota, Chigasaki, both of Japan

[73] Assignee: Victor Company of Japan, Limited, Yokohama, Japan

[21] Appl. No.: 9,077

[22] Filed: Feb. 2, 1979

[30] Foreign Application Priority Data

Feb. 3, 1978 [JP] Japan .................................. 53-10416

[51] Int. Cl.³ ........................ H04N 5/78; G11B 15/06
[52] U.S. Cl. .................................... 360/10; 360/74.4; 360/70
[58] Field of Search ................... 358/4; 360/10, 21, 33, 360/70, 73, 74.1, 74.2, 74.4

[56] References Cited

U.S. PATENT DOCUMENTS

| | | | |
|---|---|---|---|
| 3,821,787 | 6/1974 | Kihara | 360/33 X |
| 3,968,518 | 7/1976 | Kihara et al. | 360/74.4 X |
| 4,021,857 | 5/1977 | Tanimura | 360/10 X |
| 4,104,684 | 8/1978 | Wakami et al. | 360/70 |

Primary Examiner—Raymond F. Cardillo, Jr.
Assistant Examiner—Aristotelis M. Psitos

[57] ABSTRACT

A video signal reproducing system comprises a tape on which video signals are recorded along video tracks, which extend obliquely to the longitudinal direction of the tape with substantially no space therebetween. A control signal is recorded along a control track extending in the longitudinal direction, the video tracks being recorded by a plurality of rotating video heads having gaps of mutually different azimuth angles. The control signal is recorded along the control track interrelatedly with the recording of the video tracks by the video heads. A motor drives the tape in tape travel or stops the tape. A plurality of rotating, reproducing video heads successively trace the video tracks to pick up and reproduce the recorded video signals. The rotating video heads have gaps which have mutually different azimuth angles that are respectively the same as the first mentioned azimuth angles, and which have different height positions above the plane of rotation of the centers of the tracks in the width direction thereof. The control signals are reproduced from the control track of the traveling tape. A circuit delays the reproduced control signal by a specific time to obtain a delayed signal and uses this delayed signal to stop the motor and therefore the tape travel. The tape is stopped at a position relative to the reproducing video heads at which the reproduction is accomplished so that the time instant when the level of the reproduced video signal becomes a minimum is within or in the vicinity of the vertical blanking period.

7 Claims, 10 Drawing Figures

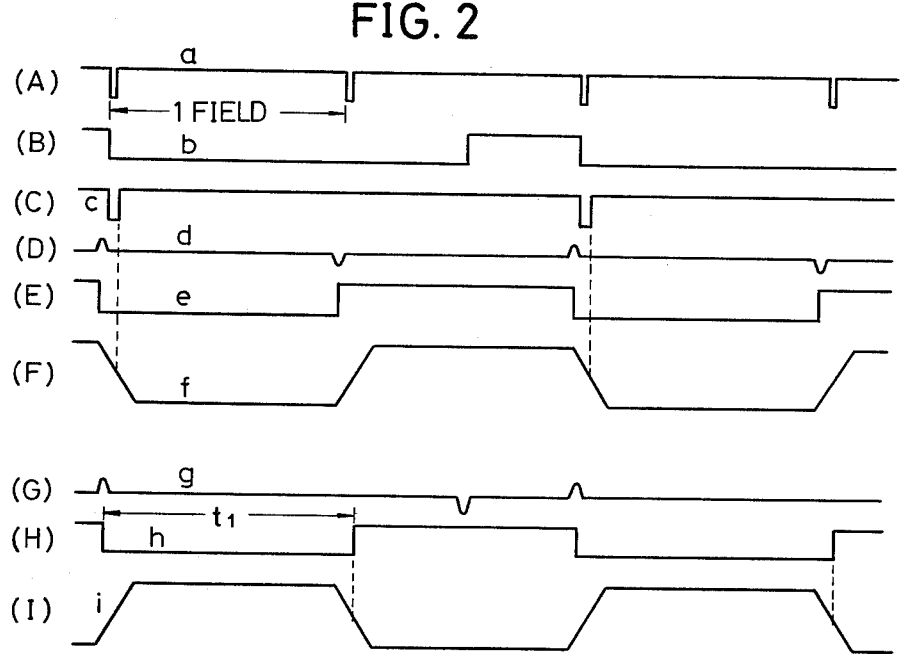
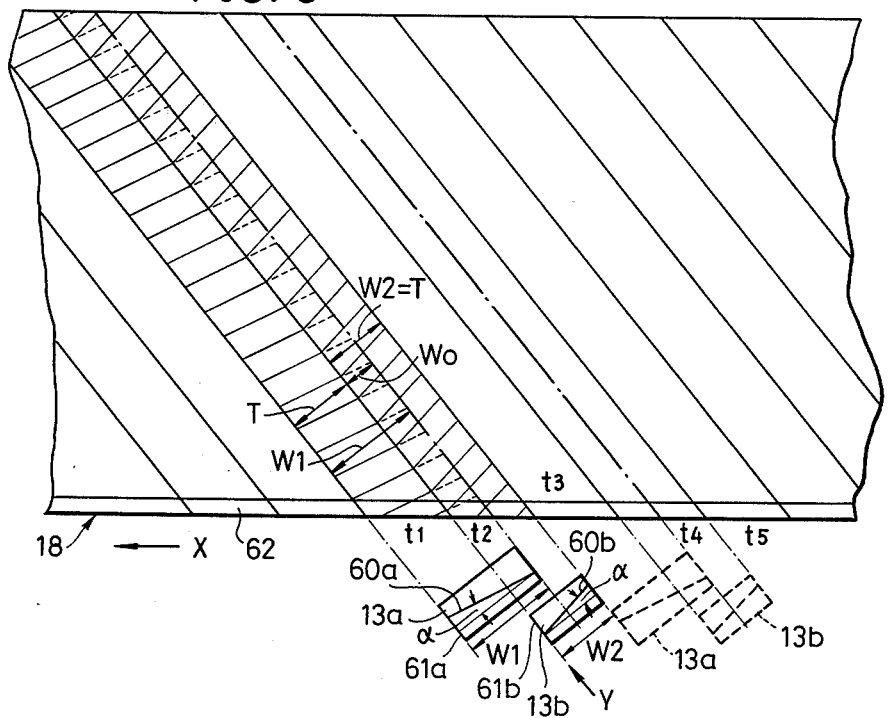

SYSTEM FOR REPRODUCING A VIDEO SIGNAL IN A SLOW MOTION OR STILL PICTURE REPRODUCTION

BACKGROUND OF THE INVENTION

The present invention relates generally to a system for reproducing video signals from a magnetic tape in such a manner of obtaining a slow-motion reproduction picture, or a still reproduction picture, and more particularly to a system for carrying out slow-motion reproduction and still picture reproduction without accompanying any noises or beats on a reproduced picture screen.

The prior art uses a system wherein a video signal is recorded on a magnetic tape on parallel tracks formed obliquely to the longitudinal direction of the magnetic tape. This tape travels at a tape speed which is different from that used at the time of recording or stops thereby to carry out speed-change reproduction such as quick-motion reproduction, slow-motion reproduction, or still picture reproduction. In this system, the tape speed at the time of reproduction is different from that at the time of recording, therefore the path (track) which the head traces on the tape during reproduction is different from the path (track) traced by the head during recording.

On the one hand, a conventional video signal recording and reproducing system, ordinarily, forms tracks on a recording medium in a manner which leaves an unrecorded zone or band called a guard band between neighboring tracks in order to prevent the generation of beats caused by the reproduced signals of neighboring tracks due to tracking deviation of the head at the time of reproduction. When a tape recorded in this manner is played back by speed-change reproduction as described above, the head traces over the track and the unrecorded band. When the head traces over the unrecorded band, the reproduced signal is remarkably lowered in level or disappears. For this reason, a noise is generated in the reproduced picture. Furthermore, in the above mentioned system, since unrecorded bands are provided between tracks, the utilization efficiency of the tape has been poor.

In addition, there has been a system wherein the angle of inclination of the tape relative to the head rotating plane is varied in accordance with the tape speed so that the heads will trace accurately over the track at the time of speed-change reproduction. However, this system has been accompanied by the problem of the complexity of the mechanism for varying the inclination angle of the tape in this manner, which gives rise to high cost of the apparatus, and by the difficulty of accurate tracking in actual practice.

On the other hand, the present applicant has previously described a system wherein tracks are formed on a tape without gaps between neighboring tracks, and, moreover, a color video signal can be recorded and reproduced without the occurrence of beat disturbance, in the U.S. patent application Ser. No. 731,935 entitled "Color video signal recording and/or reproducing system" filed Oct. 13, 1976, now U.S. Pat. No. 4,178,606, issued Dec. 11, 1979 and assigned to the assignee of this application. In this previously described system, a pair of azimuth heads having gaps which are inclined with a certain azimuth angle in mutually opposite directions with respect to the direction perpendicular to the longitudinal direction of the track are used, and neighboring tracks are formed in contiguous contact side-by-side without a gap therebetween. Furthermore, the phase of the chrominance signal is shifted by 90 degrees for every horizontal scanning period, and, moreover, the direction of this phase shifting is reversed from one track to the neighboring track. In accordance with this system, the tape utilization efficiency is high since the tracks are in close contact with each other, and, moreover, there is no occurrence of beat disturbance.

Then, the present applicant has proposed a new system wherein, in addition to adoption of the above described system, a plurality of rotating heads having gaps the centers thereof in the track width direction being different in height positions with respect to the rotational planes in which the heads travels are used, and the magnetic tape is caused to travel at a speed V which is represented by the equation $$V = V_o \left( \frac{n-1}{n} \right),$$

wherein Vo is the tape speed for normal reproduction (and recording), and n is a positive or negative integer, or to stop thereby to carry out slow-motion reproduction or still picture reproduction, in the U.S. patent application Ser. No. 892,147 entitled "Video Signal Speed-Change Reproducing System" filed on Mar. 31, 1978, and assigned to the assignee of this application, and subsequently abandoned. A continuation-in-part application Ser. No. 58,818 was filed on July 19, 1979.

This latter proposed system is capable of carrying out slow-motion reproduction or still picture reproduction with least noise. However, the magnetic tape is required to travel at the speed satisfying the above given equation, which gives rise to a problem in that slow motion reproduction at any given speeds can not be carried out. Moreover, when the traveling magnetic tape is to be stopped for still picture production, the position where the magnetic tape stops is not controlled. Accordingly, the operator is required to search the position where the magnetic tape stops with least or no noise while observing the reproduced picture screen. Thus, there arises a problem in that operation becomes rather troublesome.

SUMMARY OF THE INVENTION

Accordingly, it is a general object of the present invention to provide a novel and useful video signal slow-motion and still picture reproducing system, and in which the above described problems have been solved.

Another and specific object of the invention is to provide a system for carrying out alternately a still picture reproduction for a desired period and a normal reproduction over two track pitches, thus resulting carrying out slow-motion reproduction. The still picture reproduction in the above mode is carried out in a state without generating noise, whereby the slow-motion reproduction is carried out without generating noise as a whole. By selecting the above described still picture reproducing period at will, slow-motion reproduction can be carried out at a given slow motion ratio.

Still another object of the present invention is to provide a video signal slow-motion reproduction or still picture reproduction system in which the magnetic tape stops at a position where least noise generates at the time of still picture reproduction.

Further objects and features of the invention will be apparent from the following detailed description when read in conjunction with the accompanying drawings.

BRIEF DESCRIPTION OF THE DRAWINGS

In the drawings

FIGS. 2(A) through 2(I) are diagrams respectively indicating the waveforms of signals at various parts of the block diagram shown in FIG. 1;

FIG. 3 is a diagram indicating a track pattern at the time of recording;

DETAILED DESCRIPTION

Figure 1:
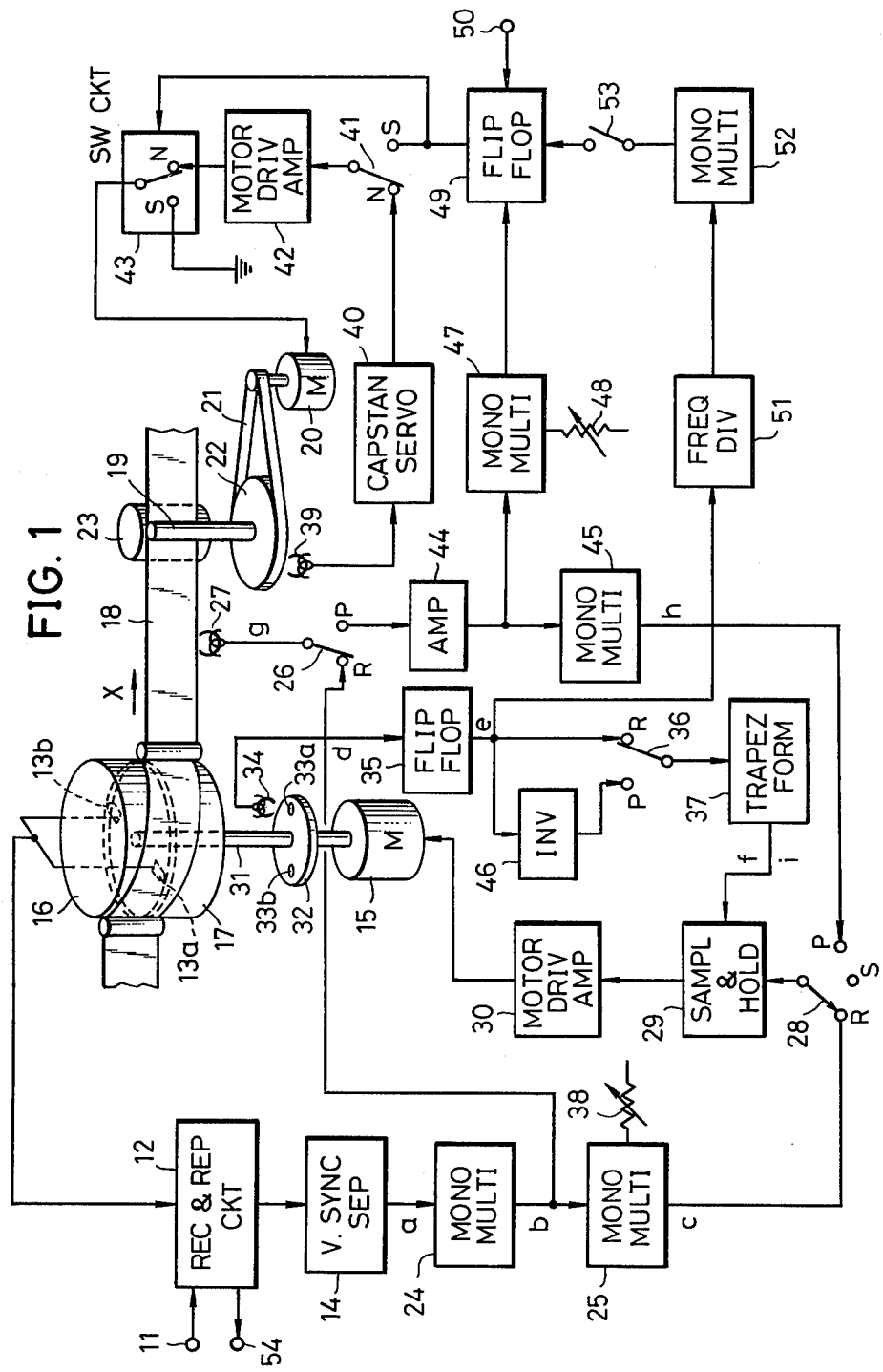
FIG. 1 is a block diagram of one embodiment of the video signal slow-motion reproduction and still picture reproduction system according to the present invention.

Referring first to FIG. 1 a video signal to be recorded is introduced into the system shown through an input terminal 11 and is passed through a recording and reproducing circuit 12 and supplied to a pair of recording and reproducing video heads 13a and 13b and to a vertical synchronizing signal separation circuit 14. The video heads 13a and 13b have mutually opposite azimuths and mutually different track widths as described hereinafter and are mounted on diametrically opposite sides of a rotary drum 16 rotated at a rotational speed of 30 rps. by a motor 15. A magnetic tape 18 is wrapped obliquely around the rotary drum 16 and a stationary drum 17 and is driven to travel in the arrow direction X by a capstan 19 driven by a motor 20 through a belt 21 and a flywheel 22, and a pinch roller 23. A video signal is recorded by the video heads 13a and 13b alternately along tracks on the tape 18, successively one field per track, the tracks being resultingly positioned contiguously to each other and obliquely relative to the longitudinal direction of the tape.

On the other hand, a vertical synchronizing signal a (FIG. 2(A)) of 60 Hz which has been separated from the video signal in the vertical synchronizing signal separation circuit 14 is supplied to a monostable multivibrator 24, where its frequency is halved to 30 Hz. The resulting output signal b indicated in FIG. 2(B) is supplied to a monostable multivibrator 25 for adjusting the phase of the signal and, at the same time, by way of a switch 26 with its moving contact connected to a contact point R in a recording mode to a control head 27, by which the signal is recorded as a control signal on the lower edge of the tape 18.

The resulting output signal c of the monostable multivibrator 25 of a waveform as indicated in FIG. 2(C) is supplied, by way of a switch 28 with its moving contact connected to a contact R, to a sampling and holding circuit 29.

The above mentioned rotary drum 16 is coaxially mounted on a rotating shaft 31, which is driven by the motor 15 and rotates together with the rotary drum 16. A pair of magnets 33a and 33b of opposite polarity are mounted on a rotating disc 32 fixed coaxially to the rotating shaft 31. Together with rotation of the rotary drum 16, pulses d of positive polarity and negative polarity as indicated in FIG. 2(D) are obtained alternately by a pickup head 34 and are supplied to a flip-flop 35. The resulting output of the flip-flop 35 of the waveform indicated in FIG. 2(E) is supplied, by way of a switch 36 with its moving contact connected to a contact R, to trapezoidal wave forming circuit 37 and formed into a trapezoidal wave signal f as indicated in FIG. 2(F), which is then supplied to the sampling and holding circuit 29.

The present embodiment is designed so that, when the output signal e of the flip-flop 35 is at its low level, the video head 13a scans the tape, and when the output signal e is at its high level, the other video head 13b scans the tape.

In the sampling and holding circuit 29, the trapezoidal wave signal is sampled in its inclined part by the sampling pulse and a slope part. Thus, the sampled pulse is held. The resulting output signal of the sampling and holding circuit 29 is supplied through a motor driving amplifier 30 to the motor 15 thereby to control the rotation thereof. The rotational phase of the motor 15 is so controlled that the sampling position on the trapezoidal wave in the sampling and holding circuit 29 will become a specific position, for example, the middle position of the inclined part of the trapezoidal wave signal.

According to the above described controlling operation, the video heads 13a and 13b are rotated with their rotational phase maintaining a specific relationship with the phase of the vertical synchronizing signal of the input video signal. Adjustment of this phase relationship is made by adjusting the time constant of the monostable multivibrator 25, which time constant is adjusted by a variable resistor 38.

On the other hand, as the capstan 19 rotates, a pickup head 39 detects the rotation of the capstan 19, in cooperation with magnets (not shown) mounted on the flywheel 22. The signal thus detected is supplied to a capstan servo circuit 40, where an error with respect to the reference speed is detected. The resulting output control signal of the capstan servo circuit 40 is passed through a switch 41 with its moving contact connected to a contact point N, a motor driving amplifier 42, and a switch circuit 43 with its moving contact connected to a contact N, and is then supplied to the motor 20 thereby to control the rotation thereof. Accordingly, the capstan 19 causes the magnetic tape 18 to travel at a constant speed such that it is shifted by an amount corresponding to one track pitch during the period of time when the video heads 13a and 13b rotate over one-half of complete single rotation respectively.

At the time of normal reproduction, the moving contacts of the switches 26, 28, and 36 are respectively switched to their contact points P, and the switch 41 and the switch circuit 43 are held with their moving contacts being connected to the contact points N. The control head 27 reproduces control signal g with a waveform as indicated in FIG. 2(G) which is supplied through the switch 26 and an amplifier 44 to a monostable multivibrator 45 having a delay time t1. The resulting output signal h of the monostable multivibrator 45 of a waveform as indicated in FIG. 2(H) is supplied through the switch 28 to the sampling and holding circuit 29. On the other hand, the output signal e of the flip-flop 35 is phase inverted by a phase inverter 46, and is then supplied through the switch 36 to the trapezoidal wave forming circuit 37. From the trapezoidal wave forming circuit 37, is derived a trapezoidal wave signal i as indicated in FIG. 2(I), which is in the polarity opposite to that of the trapezoidal wave signal f at the time of recording. The trapezoidal wave signal i is supplied to the sampling and holding circuit 29, where it is subjected to sampling by the above mentioned sampling signal h delayed by the time t1. Responsive to the output signal of the sampling and holding circuit 29, the motor 15 is controlled its rotation.

The video signal picked up or reproduced by the video heads 13a and 13b passes the recording circuit 12, and is led out through a terminal 54.

Here, it is to be understood that, when the trapezoidal wave signal f is used as a signal to be sampled also at the time of reproduction, which trapezoidal wave signal f has the same waveform as that at the time of recording, the operation for advancing rotational phase encounter some limitation. For this reason, it is adapted so that, at the time of reproduction, the downwardly inclined part of the trapezoidal wave signal i which has been phase inverted is subjected to sampling by the rising part of the signal h delayed by the time t1.

Since the gaps of the video heads 13a and 13b respectively have mutually opposite azimuths, no signal is reproduced due to azimuth losses is the case where the video heads 13b and 13a respectively scan the tracks recorded by the video heads 13a and 13b (i.e., where so-called reverse tracking is carried out). Then, at the time of normal reproduction, the rotational phase of the motor 15 is so controlled that the sampling signal h which has been formed by the monostable multivibrator 45 responsive to the pulses of positive polarity in every two fields from the control head 27, as described above, will sample the middle part of the slope of the trapezoidal wave signal formed in correspondence with pulses of positive polarity from the control head 27. In this case, the pulses of positive polarity from the control head 27 are so set that they are generated in coincidence with the rotational position of, for example, the head 13a. For this reason, in a normal reproduction mode, the rotational phases of the video heads 13a and 13b are so controlled that these heads will always scan (positive tracking) the tracks recorded by these heads 13a and 13b respectively, and the above mentioned reverse tracking does not occur.

The video heads 13a and 13b, as shown in FIG. 3, respectively have gaps 60a and 60b inclined by an angle mutually in the opposite direction relative to the direction perpendicular to the scanning direction, that is, have azimuths of the angle α. These video heads 13a and 13b have respectively different track widths W1 and W2 and are so provided that their respective end faces 61a and 61b are at the same reference face of the rotary drum 16. In the present embodiment of the invention, the width W1 is substantially equal to 1.5 W2 through L.6 W2.

Video signal recorded tracks are formed on the tape 18 by the heads 13a and 13b in the following manner. When the head 13a rotating in the arrow direction Y scans the tape 18 traveling in the arrow direction X, a recorded track of the width W1 is formed obliquely to the longitudinal direction of the tape. Next, when the head 13b scans the tape 18 with an overlap of a width Wo over the track previously formed by the head 13a, a recorded track of the width W2 (=T) is formed. Here, the overlap width Wo is so set that $Wo = W_1 - T$.

Then, since the recorded video signal has been frequency modulated, when a head scans and records a new signal with overlap over a track part which has been previously recorded, the previously recorded signal is erased by the bias effort of this new signal, and the new signal is recorded, as in known systems. Consequently, the signal recorded by the head 13a remains as a track t1 of the width T, while the signal recorded by the head 13b remains as a track t2 of the width T. Similarly thereafter, tracks t3, t5, t7, . . . (wherein the subscripts of t are odd numbers) of width T are formed by the recording of the head 13a and the erasing effect of the head, and tracks t4, t6, t8 . . . (wherein the subscripts of t are even numbers) of width T are formed by the recording of the head 13b.

In this connection it is to be understood that, in order to form the tracks in close contact in this manner, it is not absolutely necessary to use heads of different track widths as described above, it being possible to use heads of the same track width. In the practice of the system of the present invention, however, it is necessary that the track widths of the reproducing heads by different for the purpose of speed-change reproduction as described hereinafter, and, since recording also can be carried out by means of these reproducing heads, the above description has been set forth.

In this case, the tracks t1, t2, t3 . . . are in contiguous contact without gaps therebetween, whereby the tape utilization efficiency is high. Each track is recorded with a part of a video signal corresponding to substantially one field.

Here, the angle between the the video heads 13a and 13b, and the magnets 33a and 33b, and the time constant of the monostable multivibrator 25 for adjusting phase are so adjusted that a vertical synchronizing signal is positioned near an end of the track. A control signal is recorded at the lower lateral edges of the tape 18 along a control track 62 in the longitudinal direction of the tape.

Next, an operation at the time of a still picture reproduction will now be described in conjunction with FIG. 4.

For still-picture reproduction, the travel of the magnetic tape 18 is stopped, while the video heads 13a and 13b are rotated at the rotating speed which is the same as that at the time of recording or normal reproduction.

Figure 4:
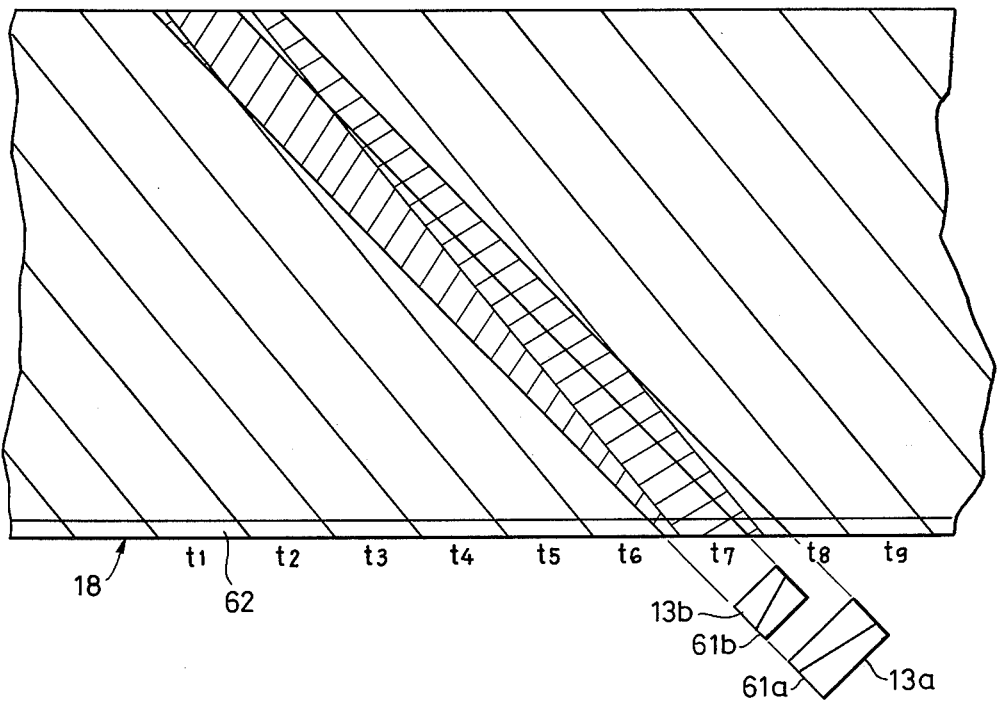
FIG. 4 is a diagram indicating the scanning track pattern at the time of still picture reproduction.

Referring to FIG. 4, when the head 13b, for example, starts to trace from a position at which it is straddling the tracks t6 and t7, it traces along the path indicated by bold full line and terminates its tracing at a position where it straddles the tracks t5 and t6. Since the tape 18 is stopped, the head 13a also, with its end face 61a tracing the same path as that of the end face 61b of the head 13b, starts to trace from a position where it straddles the tracks t6, t7, and t8 and ends its tracing at a position where it straddles the tracks t5, t6, and t7. Thereafter, the above described tracing operation is repeated.

Figure 5:
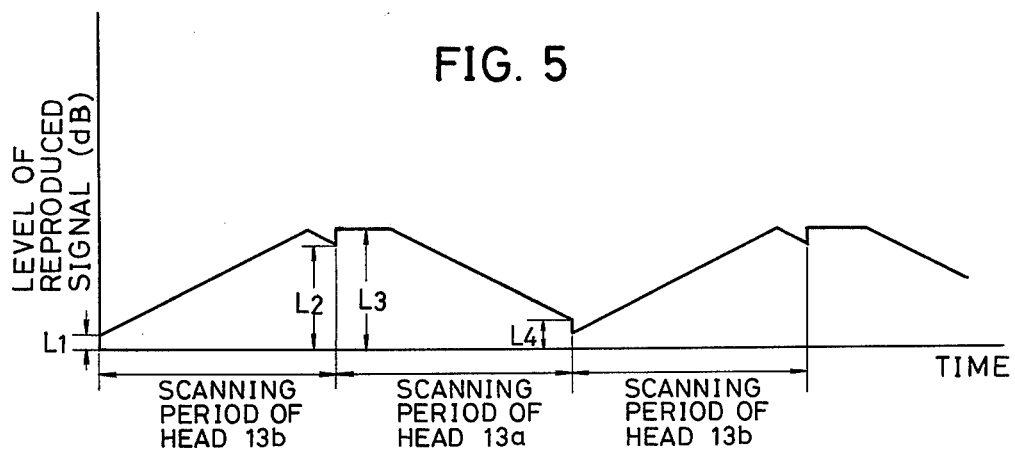
FIG. 5 is a diagram showing the level of the reproduced signal at the time of still picture reproduction.

The heads 13b and 13a have a normal tracking relationship to the tracks t6 and t7, respectively. For this reason, the level of the signal reproduced by the heads 13b and 13a is as indicated in FIG. 5. Here, it will be supposed that the relative tracing positions of the heads 13a and 13b with respect to the tape are offset, for example, to the left from the states shown in the figure. In this case, the reproducing level L1 at the time of starting of tracing of the track t6 by the head 13b increases, but the reproducing level L2 at he time of completion of tracing decreases. Furthermore, the reproducing period of the maximum level L3 of the head 13a with respect to the track t7 becomes short, and the proportions of the tracing of the track t5 at the time of completion of tracing with respect to the track t7 increases. For this reason, beat interference is produced in the portion in the vicinity of the level L4. On the other hand, when the relative tracing positions of the tape of the heads 13a and 13b are offset to the right from the states shown in the figure, the reproducing level L1 decreases from the track t6 of the head 13b, and the signal to noise ratio at this reproducing portion deteriorates greatly. Therefore, the most desirable state of the tracing path of the heads 13a and 13b relative to the tracks at the time of still picture reproduction is that indicated in FIG. 4.

Then, at the instant when the control signal is recorded by the head 27, recording of the tracks t2 (t4, t6, ...) by the video head 13b is started. Consequently, if the tape travel is arbitrarily stopped at a desired still picture reproducing instant while the magnetic tape 18 recorded in this manner is caused to travel and be reproduced, the stopping position of the tape 18 relative to the video heads will be indefinite. For this reason, manipulative operations such as to cause the tape to move through a minute distance so that the optimum tracing state in FIG. 4 is attained after stopping of the tape travel, or such as to watch the reproduced picture as the tape is driven at slow speed and to stop the tape travel at the instant when noise, beat, etc., become minimal are necessary. Such manipulative operations are troublesome and require skill and experience.

Figure 6:
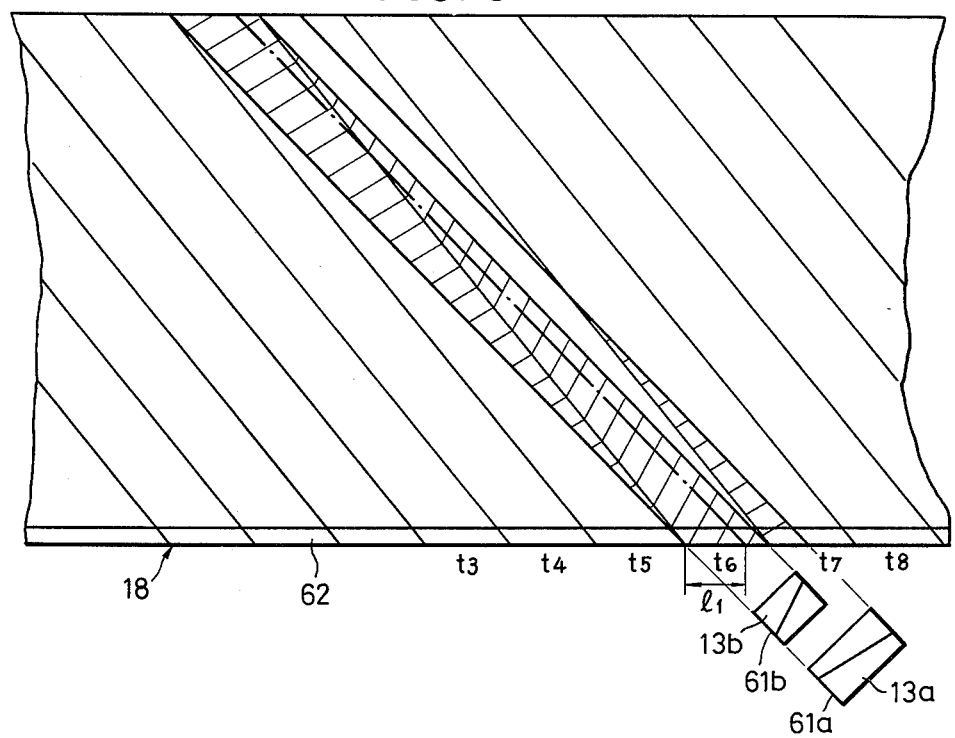
FIG. 6 is a diagram for a description of position where the tape should be stopped at the time of still picture reproduction according to the system of the present invention.

Then, if the tape travel is stopped immediately at the instant when the control signal is reproduced, the head 13b assumes the state wherein it starts tracing from the track t6, for example, while the head 13a assumes the state wherein it starts tracing from tracks t6 and t7, as indicated in FIG. 6. In this case, while the reproducing level of the track t6 is a maximum at the time of starting of tracing of the head 13b, it becomes almost zero at the time of completion of tracing, and the noise becomes very great. Furthermore, the reproduced signal from the tracks t7 and t5 gives rise to beats during a certain period after the start of tracing of the head 13a, and the quality of the reproduced picture deteriorates greatly.

In constrast, the optimum tracing positions relative to the tracks of the heads for carrying out still picture reproduction, as is apparent from FIG. 4, are the positions where the end faces 61a and 61b of the heads 13a and 13b trace along the single-dot chain line in FIG. 6. Accordingly, in the present invention, the magnetic tape 18 is caused to move through a distance $l_1$ and then stop after the control signal has been detected, and the tape travel is stopped with the heads 13a and 13b at the positions where they can trace in the optimum tracing state indicated in FIG. 4.

Figure 7:
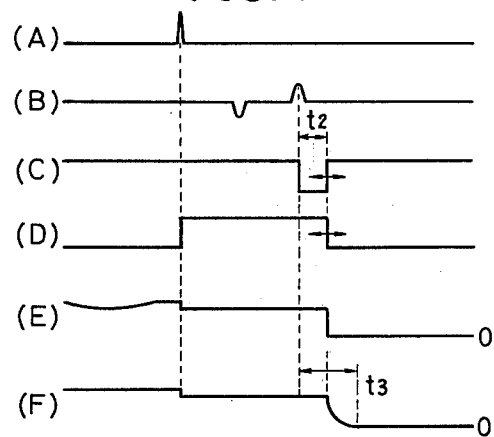
FIGS. 7(A) through 7(F) are diagrams respectively indicating the waveforms of signals at essential parts of the block diagram shown in FIG. 1, at the time of operation for still picture reproduction mode.

The still picture reproduction operation of the first embodiment of the system of the present invention will now be described with reference once again to FIG. 1. When, with the system in the state of normal reproducing mode, the manipulation button (not shown) for still picture reproduction mode is pushed, the switches 28 and 41 are changed over and connected to their contact points S. At the same time, still picture reproduction mode signals as indicated in FIG. 7(A) are applied through a terminal 50 to a flip-flop 49 as trigger pulses to trigger the same. Thereafter, a control signal reproduced by the control head 27 and having a waveform as indicated in FIG. 7(B) (the same as that indicated in FIG. 2(G) except that the time axis is compressed) is supplied by way of the switch 26 and the amplifier 44 to a monostable multivibrator 47. This monostable multivibrator 47, whose delay time constant is adjusted by a variable resistor 48, produces as output a signal of a waveform which falls in response to a control signal of positive polarity as indicated in FIG. 7(C) and rises after the elapse of a time t2 determined by the above mentioned time constant. The output of the flip-flop 49 assumes a waveform which rises in response to still picture reproduction mode signals from the terminal 50 and falls in response to a rising up of the output of the monostable multivibrator 47.

The switch circuit 43 is switched to its contact point S in response to the fall of the output of the flip-flop 49. As a consequence, as indicated in FIG. 7(E), the signal from the capstan servo circuit 40 is supplied to the motor 20 until the switch 41 is switched. After the switch 41 is switched and until the switch circuit 43 is switched, the signal from the flip-flop 49 is supplied to the motor 20, which thus rotates to drive the magnetic tape 18. However, when the switch circuit 43 is switched, the motor 20 is grounded via the contact point S and immediately stops as indicated in FIG. 7(F), and the magnetic tape stops traveling.

Thus, subsequent to the control manipulating for still picture reproduction mode, the magnetic tape 18 comes to a full stop at the end of a time t3 (equal to the sum of the above mentioned time t2 and the time of rotation of the motor 20 due to momentum) from the detection of the control signal of positive polarity. The distance $l_1$ described in connection with FIG. 6 is determined by this time t3, which in turn is adjusted in accordance with the time t2. Accordingly, the variable resistor 48 is so adjusted, and the delay time t2 of the monostable multivibrator 47 is so adjusted that the distance from the detection of the control signal to the point at which the magnetic tape 18 comes to a full sopt becomes the above mentioned desirable distance $l_1$.

As one example in actual practice, the distance $l_1$ is of the order of approximately 0.4 mm., and the delay time t2 is of the order of a number of m secs.

Figure 9:
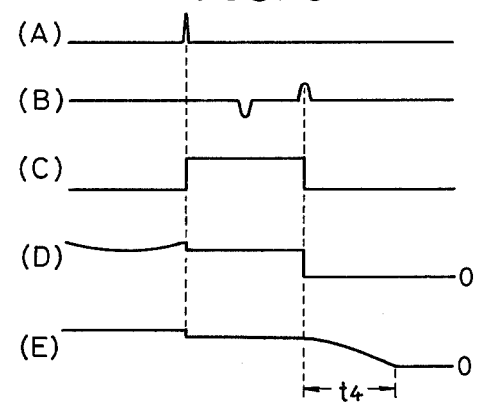
FIGS. 9(A) through 9(E) are diagrams respectively indicating the waveforms of signals at various parts of the block diagram shown in FIG. 8 at the time of operation for still picture reproduction.
Figure 8:
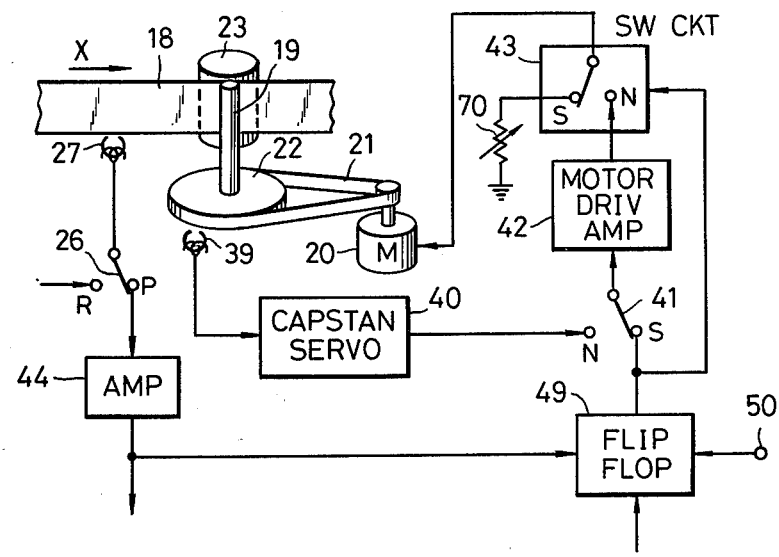
FIG. 8 is a block diagram indicating a modification of the essential part of the embodiment shown in FIG. 1.

Next, an example of modification of an essential part of the above described embodiment of the invention will be described in conjunction with FIG. 8. In FIG. 8, those parts which are the same as or equivalent to corresponding parts in FIG. 1 are designated by like reference numerals and will not be described in detail again. The flip-flop 49 produces an output signal of a waveform which, as indicated in FIG. 9(C), rises in response to still picture reproduction mode signals as indicated in FIG. 9(A) supplied though the terminal 50 as a result of the control manipulation for still picture reproduction mode and falls in response to a control signal of positive polarity, as indicated in FIG. 9(B), reproduced by the control head 27 and supplied without being passed through a monostable multivibrator. The switch circuit 43 is switched to its contact point S by the falling part of the output signal of the flip-flop 49. As a consequence, the voltage waveform applied to the motor 20 becomes as indicated in FIG. 9(D).

A variable resistor 70 is connected between the contact point S of the switch circuit 43 and the ground. Consequently, the motor 20 rotates under momentum for a time t4, which is somewhat longer than that in the case of the embodiment of the invention illustrated in FIG. 1, after the switch circuit 43 has been switched to its contact point S, as indicated in FIG. 9(E), and then stops. Here, the variable resistor 70 is so adjusted that this time t4 for rotation of the motor 20 under its momentum will be equal to the time for the magnetic tape 18 to travel through the distance $l_1$ and stop from the instant of detection of the control signal.

In some cases, the momentum (inertia) of the capstan rotation system including the capstan 19, the motor 20, the head 21, and the flywheel 22 is excessively great, whereby the magnetic tape travel cannot be fully stopped in the distance $l_1$ after detection of the control signal of positive polarity by the arrangements shown in FIGS. 1 and 8. In such a case, use is made of an arrangement wherein a control signal of negative polarity is used instead of a control signal of positive polarity reproduced by the control head 27 to trigger the monostable multivibrator 47 or the flip-flop 49.

In another example of modification, a second control head (not shown) is provided at a position spaced apart from the control head 27 by a distance $l_2$ given by the following equation, and the motor 20 is stopped by a control signal reproduced by this second control head.

$$l_2 = l_1 + 2P \cdot n - l_3,$$

where:
P is the track pitch on the magnetic tape 18;
n is an integer; and
$l_3$ is the moving distance of the magnetic tape 18 due to the momentum of the capstan rotational system.

As described above, according to the system of the present invention, optimum still picture reproduction is accomplished with minimal noise and beats in response to control manipulation for still picture reproducing mode of operation. Next, the operation of carrying out slow-motion reproduction with minimal noise and beats through the application of the principle of this optimum still picture reproduction will be described.

When the control manipulation for slow-motion reproduction mode of operation is carried out, the switches 26, 28, and 36 in the system illustrated in FIG. 1 are connected to their respective contact points P, and the switch 41 is connected to its contact point S, while a switch 53 is closed. Furthermore, the frequency dividing ratio of a frequency divider 51, which is supplied with the output of the flip-flop 35, is set in accordance with the slow-motion of the slow-motion reproduction. For example, for ½ slow-motion reproduction, the frequency division ratio is set at ½.

Figure 10:
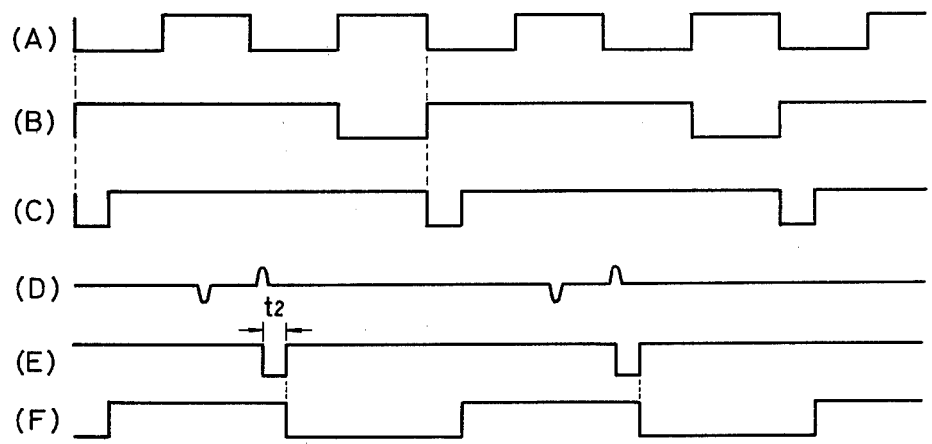
FIGS. 10(A) through 10(F) are diagrams respectively indicating the waveforms of signals at various parts of the block diagram shown in FIG. 1 at the time of slow-motion reproduction according to the system of the present invention.

The output signal of the flip-flop 35 as indicated in FIG. 10(A) (which is the same as the signal e shown in FIG. 2(E) except that the time axis is compressed relative to that in FIG. 2(E)) is subjected to ½ frequency division in the frequency divider 51, which thereby sends an output signal of a waveform as indicated in FIG. 10(B) to a monostable multivibrator 52. This monostable multivibrator 52 thereby produces an output signal of a waveform, as indicated in FIG. 10(C), which falls in response to a rise in the signal from the frequency divider 51 and rises after a specific time. This output signal is supplied through the switch 53 to the flip-flop 49.

On the other hand, a control signal reproduced by the control head 27 as indicated in FIG. 10(D) (which is the same as the signal indicated in FIG. 7(B)) is supplied to a monostable multivibrator 47, which thereby supplies a signal of a waveform as indicated in FIG. 10(E) (which is the same as the signal indicated in FIG. 7(C)) to the flip-flop 49. The flip-flop 49 produces an output signal which, as indicated in FIG. 10(F), rises in response to a rise in the signal from the monostable multivibrator 52 and falls in response to a rise in the signal from the monostable multivibrator 47.

During the high level period (2-field period) of the output signal as indicated in FIG. 10(F) from the flip-flop 49, the motor 20 rotates, and the magnetic tape 18 moves through a distance equal to twice the track pitch. Next, during the low level period (the succeeding 2-field period) of the signal, the switch circuit 43 is changed over to its contact point S, and the motor 20 stops, whereby the magnetic tape 18 is stopped. Similarly thereafter, the cyclic operation wherein the magnetic tape 18 moves by twice the track pitch and stops is repeated every 2-field period.

Then, when the average speed of the magnetic tape 18 at the time of its movement is the normal speed, a normal reproduced picture is obtained in a 2-field period, and a still picture is obtained in the succeeding 2-field period. Accordingly, as an overall average result, a slow-motion reproduced picture of ½ speed is obtained. In this operation, at every instance of still picture reproduction every other 2-field period, the magnetic tape 18 stops at a position of minimal occurrence of noise and beats which is offset by the distance $l_1$ from the poistion at the time of the control signal reproduction, similarly as in the aforedescribed atill picture reproduction operation. For this reason, noise is not generated, of course, in the normal reproduction occurring every other 2-field period, and there is almost no generation of noise also in the still-picture reproduction occurring during the other every other 2-field periods. Therefore, a slow-motion reproduced picture of good image quality without defects such as noise and beats is obtained.

In this connection, the frequency division of the frequency divider 51 is set in accordance with the slow-motion ratio, and the still picture reproduction period is thereby set, whereby a slow-motion reproduction of the desired speed is achieved. For example, for ⅓-speed slow-motion reproduction, the frequency division ratio of the frequency divider 51 is set at ⅓. Then, the signals indicated in FIGS. 10(B) and 10(C) become signals of 6-field period, and the signal indicated in FIG. 10(F) becomes one of high level during a 2-field period and one of low level during a 4-field period. As a result, normal reproduction is carried out during a 4-field period, whereby, as a whole, a slow-motion reproduction of ⅓ speed is accomplished.

Further, this invention is not limited to these embodiments. Variations and modifications may be made without departing from the scope of the invention.

What is claimed is:

1. A video signal reproducing system for carrying out still picture reproduction comprising:

a tape on which a video signal is recorded along video tracks, which extend obliquely with respect to the longitudinal direction of the tape with substantially no space between the tracks, and a control signal recorded along a control track extending in the longitudinal direction of the tape, said video tracks being recorded by a plurality of rotating video heads having gaps with mutually different azimuth angles, said control signal being recorded along the control track interrelatedly with the recording of the video tracks by the video heads;

means comprising a capstan rotated by a motor for driving the tape or for stopping the tape;

reproducing means including a plurality of rotating video heads for successively tracing the recorded video track to pick up and reproduce the recorded video signal, the rotating video heads having gaps with mutually different azimuth angles that are respectively the same as the first mentioned azimuth angles, and which have different height positions above the rotational plane at the centers of the tracks in the width direction thereof;

means for reproducing the control signal from the control track while the driven tape is traveling;

switching means for supplying and cutting off electric driving power for the motor; and means for producing a switching signal to operate the switching means to cut off the electric power, said means for producing the switching signal comprising means for delaying the control signal reproduced from the control track by a specific delay time, and means for shaping the switching signal to have a voltage waveform which rises in response to a still picture reproduction mode signal and falls in response to the delayed signal, the tape being stopped at a position where the reproducing video heads are reproducing the video signal with a minimum level while the relative head and tape positions are within or in the vicinity of the vertical blanking period.

2. A video signal reproducing system as claimed in claim 1 in which the switching means connects the motor directly to ground during the cut-off state.

3. A video signal reproducing system as claimed in claim 1 in which the switching means connects the motor to ground through a variable resistor connected between the switching means and ground during the cut-off state.

4. A video signal reproducing system for carrying out slow-motion reproduction comprising:

a tape on which a video signal is recorded along video tracks, which extend obliquely with respect to the longitudinal direction of the tape with substantially no space between the tracks, and a control signal recorded along a control track extending in the longitudinal direction of the tape, said video tracks being recorded by a plurality of rotating video heads having gaps with mutually different azimuth angles, said control signal being recorded along the control track interrelatedly with the recording of the video tracks by the video heads;

means comprising a capstan rotated by a motor for driving the tape or for stopping the tape;

reproducing means including a plurality of rotating video heads for successively tracing the recorded video track to pick up and reproduce the recorded video signal, the rotating video heads having gaps with mutually different azimuth angles that are respectively the same as the first mentioned azimuth angles, and which have different height positions above the rotational plane at the centers of the tracks in the width direction thereof;

means for reproducing the control signal from the control track while the driven tape is traveling;

switching means for supplying and cutting off electric driving power for the motor;

means for producing a switching signal to operate the switching means to cut off the electric power;

means for detecting the rotational position of the video heads to produce a rotation detection signal; and means for frequency dividing the rotation detection signal, said means for producing the switching signal comprising means for delaying the reproduced control signal for a specific delay time to produce a delayed signal and means for generating the switching signal with a voltage waveform which rises in response to an output signal from the frequency dividing means and falls in response to the delayed signal, the tape being stopped at a position where the reproducing video heads are reproducing the video signal with a minimum level while the relative head and tape positions are within or in the vicinity of the vertical blanking period.

5. A reproducing system as claimed in claim 4 in which the frequency dividing means is of an organization by which the frequency division ratio of the frequency dividing means is varied and set in accordance with the slow-motion ratio of the slow-motion reproduction of the video signal.

6. A video signal reproducing system as claimed in claim 4 in which the switching means connects the motor directly to ground during the cut-off state.

7. A video signal reproducing system as claimed in claim 4 in which the switching means connects the motor to ground through a variable resistor connected between the switching means and ground during the cut-off state.

* * * * *